United States Patent
Tricault et al.

[15] 3,678,248
[45] July 18, 1972

[54] HOUSEHOLD DISH-HEATING APPLIANCE

[72] Inventors: Yves P. Tricault, 23 Boulevard Montmorency, Paris; Gerard J. Tricault, 90 Avenue Andre Morizet, Boulogne-Billancourt, both of France

[22] Filed: March 15, 1971

[21] Appl. No.: 124,064

[52] U.S. Cl............................219/525, 99/389, 219/387, 219/405, 219/439, 219/521
[51] Int. Cl..........................................................H05b 3/06
[58] Field of Search.................219/386, 387, 405, 438, 439, 219/521, 524, 525, 530; 338/238; 99/374, 389

[56] References Cited

UNITED STATES PATENTS

| | | | | |
|---|---|---|---|---|
| 1,990,412 | 2/1935 | Merritt | | 219/524 X |
| 1,939,017 | 12/1933 | Naeve | | 219/524 |
| 2,725,457 | 11/1955 | Norton | | 219/525 |
| 1,673,568 | 6/1928 | Johnson | | 219/525 |
| 2,479,268 | 8/1949 | Sarria | | 219/530 X |
| 563,780 | 7/1896 | Minchev | | 338/238 X |
| 2,643,324 | 6/1953 | Goldstaub | | 219/529 |
| 2,644,880 | 7/1953 | Valentini et al. | | 219/525 |
| 3,051,582 | 8/1962 | Muckler et al. | | 219/386 X |
| 3,129,317 | 4/1964 | Howard | | 219/387 |
| 3,385,952 | 5/1968 | Mix | | 219/387 |

*Primary Examiner*—Volodymyr Y. Mayewsky
*Attorney*—Abraham A. Saffitz

[57] ABSTRACT

A food heating appliance comprising a base in bowl form and a lid fitting the shape of one or several dishes to be heated. The base consists of a body of refractory material in which a first heating electrical resistance is embedded; this body is bounded by two metal plates; the lid, fitting over the base and dish or dishes, is also made of a body of refractory material in which a second heating electrical resistance is embedded and is bounded by an upper and a lower metal plate. The lower plate is polished and reflective. The resistances are preferably series-connected.

7 Claims, 5 Drawing Figures

INVENTORS:
Yves P. TRICAULT
and Gerard J. TRICAULT

By Abraham A. Saffitz
ATTORNEY

PATENTED JUL 18 1972
SHEET 3 OF 3
3,678,248
Fig. 4
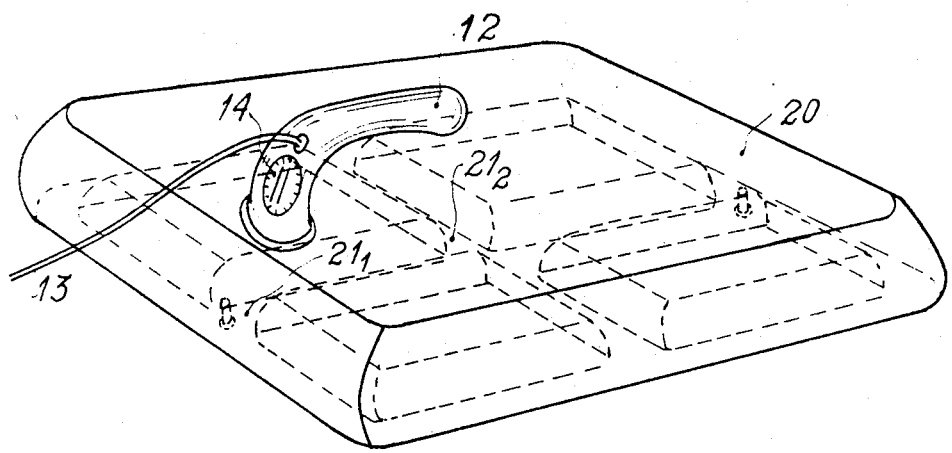
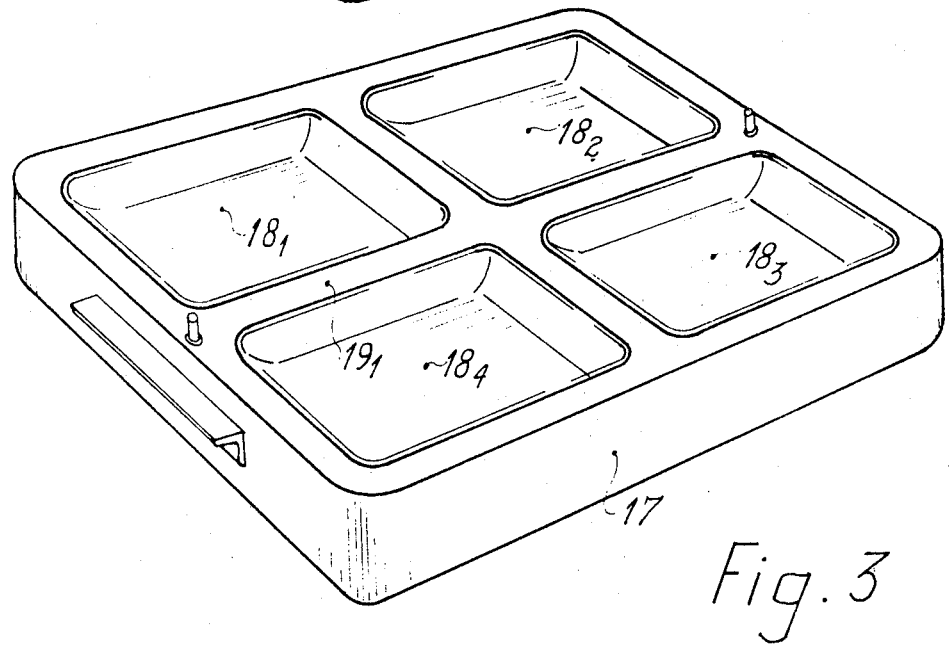
Fig. 3
INVENTORS:
Yves P. TRICAULT
and Gerard J. TRICAULT
By Abraham A. Saffitz
ATTORNEY

HOUSEHOLD DISH-HEATING APPLIANCE

The present invention relates to a household appliance intended for heating ready-cooked dishes and deep-frozen dishes in particular.

Heating appliance have become particularly convenient owing to the considerable development of the ready-cooked dish industry, provided they fulfil certain conditions; otherwise the gustatory properties of these dishes will be affected in a highly undesirable manner. Indeed, the "heated-up" taste is well-known, which food takes when the operation is carried out in an elementary manner, for example when it is thought sufficient to pour the ready-cooked dish into a pot which is heated on a gas-cooker.

In the U.S. Pat. No. 3,414,709 there is described an appliance for heating ready-cooked dishes in quantity. This appliance offers a number of slight inconveniences which, without being of much importance in normal employment condition, could be troublesome for household appliances. The appliance is in the shape of a doorless heating cupboard, thermally insulated, inside which are fitted numerous stacked heating elements, composed of electrical resistances between which are placed a set of shelves carrying the dishes to be heated. This set of shelves is displaceable and is carried on a trolley. It is placed in front of the heating cupboard and forms the door to the latter.

It is clear that, to ensure smooth entry and exit of the ready cooked dishes into and from the cupboard, it is necessary to arrange for a certain space between the heating resistances, if only to let through the shelving grids themselves. On the other hand, for manufacturing and ease of maintenance reasons, it is preferable not to arrange the heating resistances along the inner vertical walls of the cupboard. This results in the outer wall of the housing enclosing the food receiving thermal radiation from both the sources of heat and the non-heating sections of the cupboard and reflecting the rays issuing from these sources towards the colder parts of the arrangement.

This also means that a part of the power received by the containers containing the foodstuff serves solely to heat the cupboard. The system does not thus have heat balance; it receives rays from the sources which it transfers to the cupboard. Therefore, a considerable part of the spent energy is wasted. This inconvenience may be considered as a minor one for appliances intended for communities, useless expenditure on electricity being, in any case, practically negligible compared with the considerable costs of operating a works restaurant or a hospital kitchen.

The case is not the same for household appliances. When calculating the cost price, the utilizer is ready to neglect the time spent for a given operation. On the contrary, he is highly sensitive to any expenditure of cash to be made by himself, and an economy in this respect, even a relatively small one, will be taken into consideration.

In the appliance of the invention, the number of dishes to be heated is not a large one; at the most those for one meal, let us say four. It is therefore no longer necessary to arrange the dishes one above the other, and perfectly reasonable to place them one beside the other. This remark leads to a highly advantageous realization in which the useless loss of power is reduced to a negligible minimum.

Moreover, in the formerly known appliances, the rays reflected by the outer surface of the housing depend on the optical qualities of this surface. As the system has no thermal balance, the heating of the said surface will also depend on its optical quality, its state of polish, its stains, scratches etc. . . . The effect is no doubt not very important, since part of the rays reflected by the dishes heats other dishes contained in the cupboard. However, it does exist and may explain certain slight irregularities in the heating of dishes, generally speaking not very troublesome ones when the equipment is well maintained.

The latter drawback is entirely eliminated in the appliance of the invention. In the latter, the inside of the heating appliance which, optically speaking, is the same as that of the dishes, forms a black body in which the physical condition of the wall plays no part and where the time required for reaching the desired temperature level no longer depends on the above-mentioned surface condition.

The heating appliance of the invention comprises a hollow base in bowl form made of refractory material bounded by two metal sheets, the upper one fitting exactly the shape of the dishes or plates containing the food to be heated, in which is embedded a base heating resistance, and a dish-cover acting as a lid fitting over the base, made of heat-insulating material bounded by two metal sheets (the lower sheet being reflective) and embedding a lid heating resistance.

As will be shown later, the power supplied by the lid resistance is comprised between one half and one quarter of that supplied by the base resistance.

The invention will now be described in detail in connection with the annexed drawings, in which:

FIG. 3 is a perspective view of a heating appliance in accordance with the invention and designed for heating four dishes;

FIG. 4 is a perspective view of the lid of the appliance of FIG. 3; and

When food to be heated and contained in a dish or porcelain plate is placed in the appliance, its upper part is mainly heated by rays and its lower part mainly heated by conduction.

The law of heat transmission by conduction, assuming the respective temperatures $T_s$ and $T'$ of the heat source and of the heat-receiving body to be constant, is expressed by:

$$Q' = (cS)/(\gamma) (T_s - T')t \qquad (1)$$

where $Q'$ is the quantity of heat supplied by the base heating resistance during the time $t$, $c$ the heat conductivity of the material forming the base, $S$ its surface and $\gamma$ the thickness of the material traversed by the heat, $T_s$ the absolute temperature of the base heating resistance and $T'$ the absolute temperature of the heating plate. The value $T'_o$ of $T'$ at the initial moment $t = o$ varies, according as to whether the dish is a deep frozen one or a dish at the ambient temperature, from 265° to 300° K. If $C$ designates the calorific capacity of the appliance's base heating plate, one has the differential relationship:

$$dQ' = CdT' \qquad (2)$$

By combining the equation (1) now written in differential form with respect to time, that is $$dQ' = (cS)/(\gamma) (T_s - T') dt$$

($T'$ being no longer constant), it is found that:

$$(T_s - T') = (T_s - T'_o) \exp(-cSt/C\gamma)$$
$$= (T_s - T'_o) \exp(-t/\theta) \qquad (3)$$

with $1/\theta$ equal to $(cS/C\gamma)$.

Figure 5:
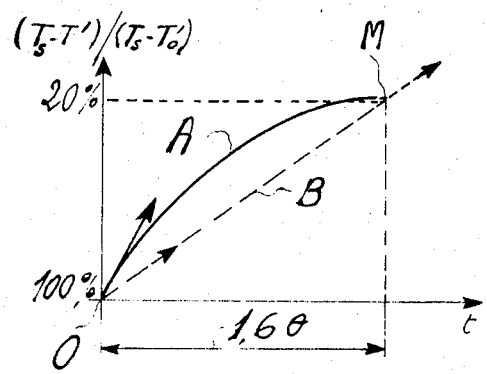
FIG. 5 is a diagram for explaining the functioning of the appliance according to the invention.

The curve giving $T'$ as a function of $t$ is the curve A in FIG. 5.

The power radiated by the lid is proportional to the difference between the fourth powers of the absolute temperature of the inner side of the lid $T_c^4$ and the absolute temperature of the upper part of the dish to be heated $T''^4$. The temperature $T''$ varies from an initial value $T_o''$ which is the same as that $T_o'$ of $T'$, that is to say comprised between 265° K. and 300° K., to the final heating temperature, let us say 350° K. In the whole variation range of $T''$, $T''^4$ can be neglected as compared to $T_c^4$ which, as will be seen, is in the range of 450° K.

This means that the power $Q''$ issuing from the dish-cover radiating towards the dish is basically constant (at most very slightly decreasing) as a function of time and that $T''$ is then a linearly increasing function of time $t$ (curve B in FIG. 5).

It may be assumed, for instance, that the insulated base heating resistance be at a temperature $T_s$ of 90° C., the initial temperature $T_o'$ be at most 15° C., and the final temperature of the heating plate be limited to 75° C., in order to avoid any burning of the dish, this corresponding to a variation of $(T_s - T')$ from 100 to 20 percent, thus to a variation of $t$ equal to 1,6 $\theta$.

Then, referring to FIG. 5, the ordinates of points O and M respectively corresponding to the values 100 percent and 20 percent of the quantity $(T_s - T')/(T_s - T'_o)$ while the difference in their abscissas is 1,6 $\theta$. The slope of curve A at point O, which is proportionate to $Q'$, is $1/\theta$. The slope of curve B which is proportionate to $Q''$ is $(100\% - 20\%)/(1,6\ \theta) = \frac{1}{2}\ \theta$. The result is that the value of $Q''$ should be twice that of $Q''$, and thus that the value of the base heating resistance should be twice that of the lid heating resistance.

In the preceding explanations, it has not been possible to take into account losses of heat by radiation from the base. These losses lead to increase the ratio $Q'/Q''$ from 2 to 4. In point of fact, the experiments of the present applicants have shown that good results are obtained when the ratio $Q'/Q''$ is comprised between 2 and 4.

It is very important to observe that the upper part of the dish is always at a higher temperature than the lower one and that a fortiori the dish-cover is always at a higher temperature than the rest of the appliance housing. Consequently, there is no possibility of steam condensation, and a favorable condition for heating the ready-cooked dishes without modifying their taste is thus fulfilled.

It should also be remarked that the fulfilling of the latter condition is independent of the value of the factor $(cS/C\gamma)$.

Figure 1:
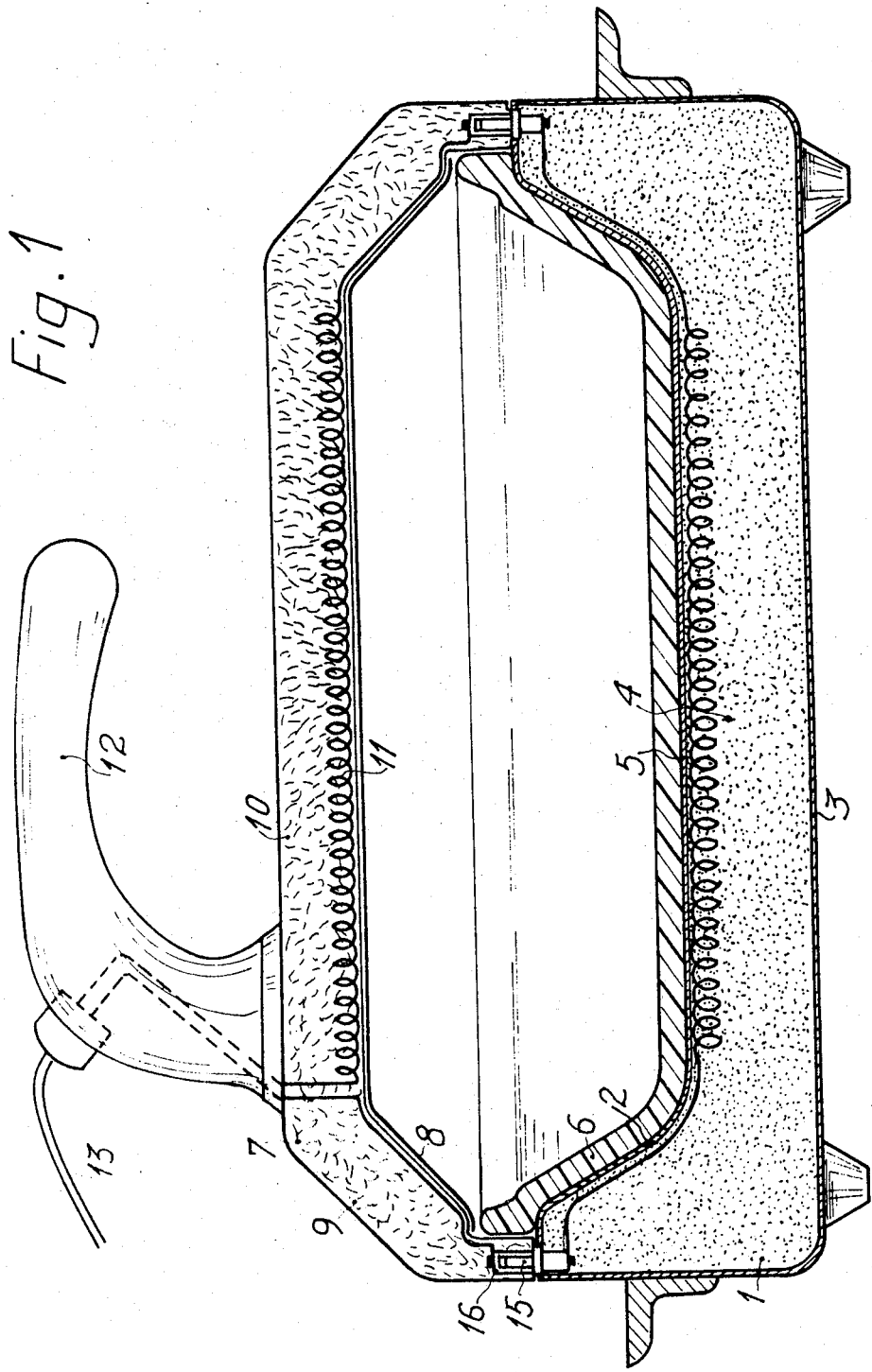
FIG. 1 is a transversal section view of a heating apparatus in accordance with the invention and designed for heating one dish.
Figure 2:
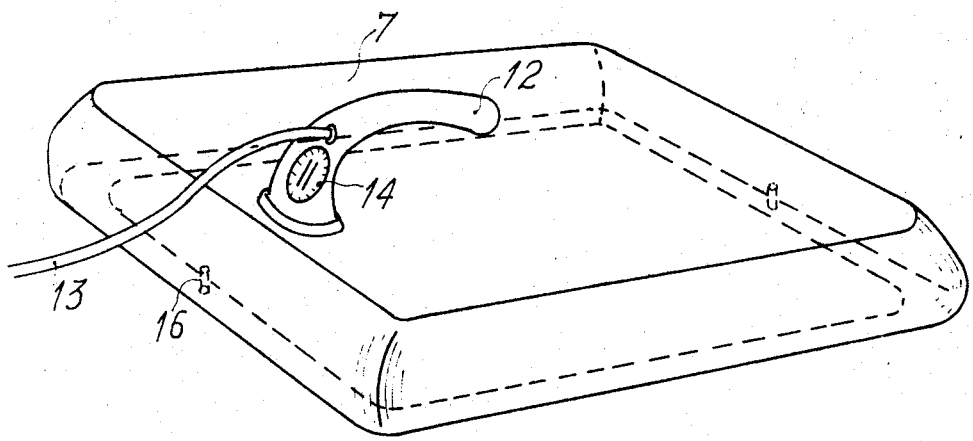
FIG. 2 is a perspective view of the lid of the appliance of FIG. 1.

Referring now to FIGS. 1 and 2, a hollow base 1 formed of two aluminum plates 2 and 3 is shown, forming a housing containing refractory material 4 such as sand or gravel. The heat conductivity of the base material is in the range of 1 kilocal/(meter×hour×degree). Inside this material 4 an insulated heating resistance 5 is embedded, which in order to heat the base in homogeneous manner, is in the form of a spiral if the base is round, or in that of a sinusoidal curve with its axis parallel to one of the sides of the base, if the latter is square.

The hollow part of the base exactly fits the shape of the dishes 6 containing the food to be heated. These dishes are made of porcelain or similar materials, as usual.

The base is covered with a dish-cover or lid 7 composed of an inner envelope 8 consisting of a polished stainless steel plate, an outer envelope 9 made of aluminum sheet and a heat insulating filler material 10, for instance a piece of asbestos or glass wool. The heat conductivity of the lid material is in the range of 0.2 to 0.3 kcal/(meter × hour × degree). An insulated heating resistance 11 is embedded in the latter heat insulating material with an arrangement similar to that of resistance 5 in 4.

The lid 7 is provided with a handle 12 containing the power conductor 13 and a timing mechanism 14 (not shown in FIG. 1 but shown in FIGS. 2 and 4).

Resistances 5 and 11 are connected in series by means of plugs 15 fitted into the lid and corresponding sockets 16 fitted in the base. In this manner the current is automatically cut off when the lid is not secured to the base.

FIGS. 3 and 4 represent an appliance designed for heating four plates. The base 17 is divided into 4 bowls $18_1$ to $18_4$, separated from each other by partitions $19_1$, $19_2$. These partitions are hollow and contain refractory materials, like the bottom of the base. The heating resistance is arranged in sinusoidal form throughout the whole surface of the base.

The lid is divided into four smaller lids by partitions $21_1$ and $21_2$ which, when the lid is its normal position over the base, are superimposed and jointed with the partitions $19_1$ and $19_2$. These partitions are hollow and contain heat resisting material like the inside of the lid. The metal sheets forming the inner wall of these smaller lids are made of polished stainless steel.

The value of the base resistance is comprised between four times and twice that of the lid resistance, for the reasons which have been explained above.

What we claim is:

1. A food heating appliance comprising a base having a plurality of recesses and partitions separating said recesses from each other, each of said recesses fitting the shape of a dish to be heated, said base being made of a body of refractory material containing a base heating electrical wire resistance, said base being bounded by two metal plates, a lid closely fitting over said base and partitions and made of a body of heat-insulating material containing a lid heating electrical wire resistance and bounded by an upper and a lower metal plate, said lower plate being polished and reflective, said base and lid containing electrical connecting means for connecting said base heating wire resistance and lid heating wire resistance in series with each other, and said base heating resistance having a resistance value between two and four times that of said lid heating resistance.

2. A food heating appliance as claimed in claim 1, in which said refractory material consists of sand.

3. A food heating appliance as claimed in claim 1, in which said refractory material consists of gravel.

4. A food heating appliance as claimed in claim 1, in which said two metal plates are made of aluminum sheet.

5. A food heating appliance as claimed in claim 1, in which said lower plate is made of polished stainless steel.

6. A food heating appliance as claimed in claim 1, in which said heat-insulating material is asbestos.

7. A food heating appliance as claimed in claim 1, in which said heat-insulating material is glass wool.

* * * * *